J. GORMAN.
PITMAN.
No. 173,458. Patented Feb. 15, 1876.
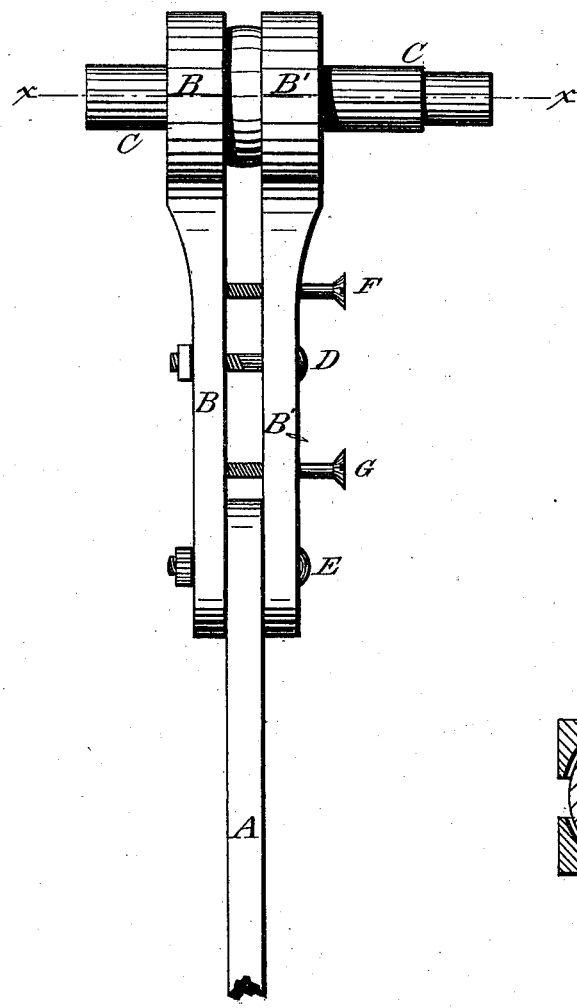
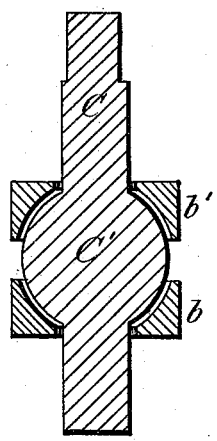
Attest:
Wm Baggers
C. A. Snow.
Inventor:
John Gorman,
by Louis Bagger.
his Atty.

UNITED STATES PATENT OFFICE.

JOHN GORMAN, OF MOUNT VERNON, ILLINOIS, ASSIGNOR OF TWO-THIRDS HIS RIGHT TO THOMAS AINSWORTH AND HENRY C. TAYLOR, OF SAME PLACE.

IMPROVEMENT IN PITMEN.

Specification forming part of Letters Patent No. 173,458, dated February 15, 1876; application filed November 2, 1875.

*To all whom it may concern:*

Be it known that I, JOHN GORMAN, of Mount Vernon, in the county of Jefferson and State of Illinois, have invented certain new and useful Improvements in Universal Joints for Reapers, &c.; and I do hereby declare that the following is a full, clear, and exact description thereof, which will enable others skilled in the art to which it appertains to make and use the same, reference being had to the accompanying drawings and to the letters of reference marked thereon, which form a part of this specification, and in which—

Figure 1 is a top plan; and Fig. 2 is a transverse section after the line indicated by $x\ x$ in Fig. 1.

Similar letters refer to corresponding parts in both the figures.

This invention consists in the construction, combination, and arrangement of parts of a universal joint in such a manner that it shall be suitable for the pitmen of reaping and mowing-machines, by which a reciprocating motion is imparted to the sickle, universal joints, as heretofore generally constructed, not being suitable for that purpose on account of their liability to become clogged up with dirt, particles of straw, &c.

In the drawing, A is the pitman, B is the intermediate double joint, and C is the crank secured to the revolving disk, by which a reciprocating motion is imparted to the pitman. The crank C is enlarged to form the ball C', which is clasped by the two parts B and B', of the double joint that forms the connection between the crank and the pitman, the ends of said parts being enlarged to form cup-shaped recesses, represented at $b\ b'$ in Fig. 2, for the ball C' to rest in. The enlarged ends of B and B' are bored through to admit of the insertion of the shaft of the crank C on both sides of the ball C', as shown.

D E are tightening screws or bolts, by which the opposite sides B and B' may be brought closer together, and a tighter joint effected between the spherical surface of C' and the cups $b$ and $b'$; and F G are set-screws, inserted through the side of B' and working against the inner side of B, by operating which the distance between the two sides of the double joint may be enlarged and the joint loosened, more play being given the ball C' in the cups $b\ b'$. The tightening-screw E also serves as a pivot for the pitman A.

By this construction and arrangement a simple and easily-operated universal joint is produced, not liable to get out of order or become clogged up. It may be used to advantage on thrashing-machines, harvesters, reapers, and agricultural machinery generally, which is always subject to a large amount of dust or particles of vegetable matter while in operation.

Having thus described my invention, I claim and desire to secure by Letters Patent of the United States—

The double joint B B', having enlarged ends forming cup-shaped recesses $b\ b'$, tightening-bolts D E, and set-screws F G, in combination with the pitman A and crank C, having the ball C', all constructed and arranged for operation substantially as and for the purpose hereinbefore set forth.

In testimony that I claim the foregoing as my own, I have hereto affixed my signature in presence of two witnesses.

JOHN GORMAN.

Witnesses:
J. B. GOODRICH,
JOHN S. BOGAN.